(12) United States Patent
Park et al.

(10) Patent No.: US 7,957,697 B2
(45) Date of Patent: Jun. 7, 2011

(54) APPARATUS AND METHOD FOR CONTROLLING HOME APPLIANCES USING ZIGBEE WIRELESS COMMUNICATION

(75) Inventors: Wan-Ki Park, Daejon (KR); Jin-Soo Han, Daejon (KR); In-Tark Han, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 738 days.

(21) Appl. No.: 11/952,270

(22) Filed: Dec. 7, 2007

(65) Prior Publication Data

US 2008/0137572 A1 Jun. 12, 2008

(30) Foreign Application Priority Data

Dec. 8, 2006 (KR) .................. 10-2006-0124826

(51) Int. Cl.
*H04B 7/00* (2006.01)
(52) U.S. Cl. ........ 455/41.2; 455/419; 455/403; 370/255
(58) Field of Classification Search .................. 455/403, 455/41.2; 370/255
See application file for complete search history.

(56) References Cited

U.S. PATENT DOCUMENTS

| 5,010,445 | A  | * | 4/1991  | Weinold ......................... 361/728 |
| 6,636,157 | B1 | * | 10/2003 | Sato .......................... 340/825.22 |
| 7,616,110 | B2 | * | 11/2009 | Crump et al. ............. 340/539.11 |
| 2005/0053017 | A1 | * | 3/2005 | Komiya et al. ............... 370/255 |
| 2007/0123194 | A1 | * | 5/2007 | Karaoguz et al. ............. 455/403 |

FOREIGN PATENT DOCUMENTS

| KR | 1020040028668 | 4/2004 |
| KR | 1020040067686 | 7/2004 |
| KR | 1020040075289 | 8/2004 |
| KR | 1020050087051 | 8/2005 |
| KR | 1020050091221 | 9/2005 |
| KR | 1020050091418 | 9/2005 |
| KR | 1020050094255 | 9/2005 |
| KR | 1020050106849 | 11/2005 |
| KR | 10-0678281 | 1/2007 |
| KR | 1020070060961 | 6/2007 |

OTHER PUBLICATIONS

Korean Notice of Patent Grant dated Mar. 31, 2008 for the corresponding application KR 10-2006-0124826.

* cited by examiner

*Primary Examiner* — Lester Kincaid
*Assistant Examiner* — Isaak R Jama
(74) *Attorney, Agent, or Firm* — Ladas & Parry LLP

(57) ABSTRACT

Provided are an apparatus and method for controlling home appliances using zigbee wireless communication. The apparatus, includes: a memory for storing a control profile and an operation program, and operating the stored operation program; a display means for supporting interface with a user; a display input/output control means for controlling input/output of the display means; a first wireless network interface for transmitting/receiving wireless data to/from home appliances based on zigbee wireless communication; and a control means for forming Wireless Personal Area Network (WPAN) with the home appliances based on the first wireless network interface, displaying a list of controllable home appliances based on device product information transferred from the home appliances through the WPAN, reading a control profile in the memory upon home appliances control request of the user, and transferring the control profile through the first wireless network interface.

6 Claims, 10 Drawing Sheets

APPARATUS AND METHOD FOR CONTROLLING HOME APPLIANCES USING ZIGBEE WIRELESS COMMUNICATION

CROSS-REFERENCE(S) TO RELATED APPLICATIONS

The present invention claims priority of Korean Patent Application No. 10-2006-0124826, filed on Dec. 8, 2006, which is incorporated herein by reference.

BACKGROUND OF THE INVENTION

1. Field of the Invention

The present invention relates to an apparatus and method for controlling home appliances using zigbee wireless communication; and, more particularly, to a home appliances controlling apparatus and method that a user can easily control a plurality of home appliances by using a wireless network based integrated remote control by forming Wireless Personal Area Network (WPAN) using zigbee wireless communication, transferring a control message upon home appliances control request of the user transferred through the WPAN based on a control profile corresponding to product information of each home appliance to the home appliance, transforming the control message into an infrared ray remote control signal, and transferring the control message to the home appliances.

This work was supported by the IT R&D program for MIC/IITA [2005-S-112-02, "A Development of Open Home Network Framework Technologies"].

2. Description of Related Art

A conventional home appliances control technology stores a control code for controlling a plurality of home appliances in a memory inside a unification remote control, transforms the stored control code according to the home appliance, and controls a plurality of home appliances. There is a problem that a user can change the control code according to each home appliance only when the user searches every home appliance in a list of a plurality of home appliances and manually selects a corresponding menu.

SUMMARY OF THE INVENTION

An embodiment of the present invention is directed to providing a home appliances controlling apparatus and method that a user can easily control a plurality of home appliances by using a wireless network based integrated remote control by forming Wireless Personal Area Network (WPAN) using zigbee wireless communication, transferring a control message upon home appliances control request of the user transferred through the WPAN based on a control profile corresponding to product information of each home appliance to the home appliance, transforming the control message into an infrared ray remote control signal, and transferring the control message to the home appliances.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an apparatus for controlling home appliances using zigbee wireless communication, the apparatus including: a memory for storing a control profile and an operation program, and operating the stored operation program; a display means for supporting interface with a user; a display input/output control means for controlling input/output of the display means; a first wireless network interface for transmitting/receiving wireless data to/from home appliances based on zigbee wireless communication; and a control means for forming WPAN with the home appliances based on the first wireless network interface, displaying a list of controllable home appliances based on device product information transferred from the home appliances through the WPAN, reading a control profile in the memory upon home appliances control request of the user, and transferring the control profile through the first wireless network interface. The apparatus further includes a second wireless network interface for receiving a new control profile on new home appliances from a server through broadband wireless communication. Also, the apparatus further includes a control signal transform means for transferring the product information of the home appliances to the control means through the formed WPAN, receiving the control profile on the product information of the home appliances, transforming a wireless network control message transferred from the first wireless network interface into an infrared ray remote control signal based on the control profile, and controlling the home appliances.

In accordance with another aspect of the present invention, there is provided a method for controlling home appliances based on a wireless network based integrated remote control having a zigbee wireless communication function, including the steps of: forming WPAN by transferring a WPAN's message format to home appliances based on zigbee wireless communication; receiving device product information through the formed WPAN and transferring a control profile corresponding to the transferred device product information to each home appliance; displaying a list of controllable home appliances to a user, creating a wireless network control message upon receiving a device control request of the user, and transferring the wireless network control message to the home appliances; and transforming the transferred wireless network control message into an infrared ray remote control signal on the basis of transferred control profile in the home appliances. The method further includes the step of: receiving a control profile on home appliances, which is a new control object, from a server through broadband wireless communication when a control profile corresponding to the transferred device product information does not exist.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
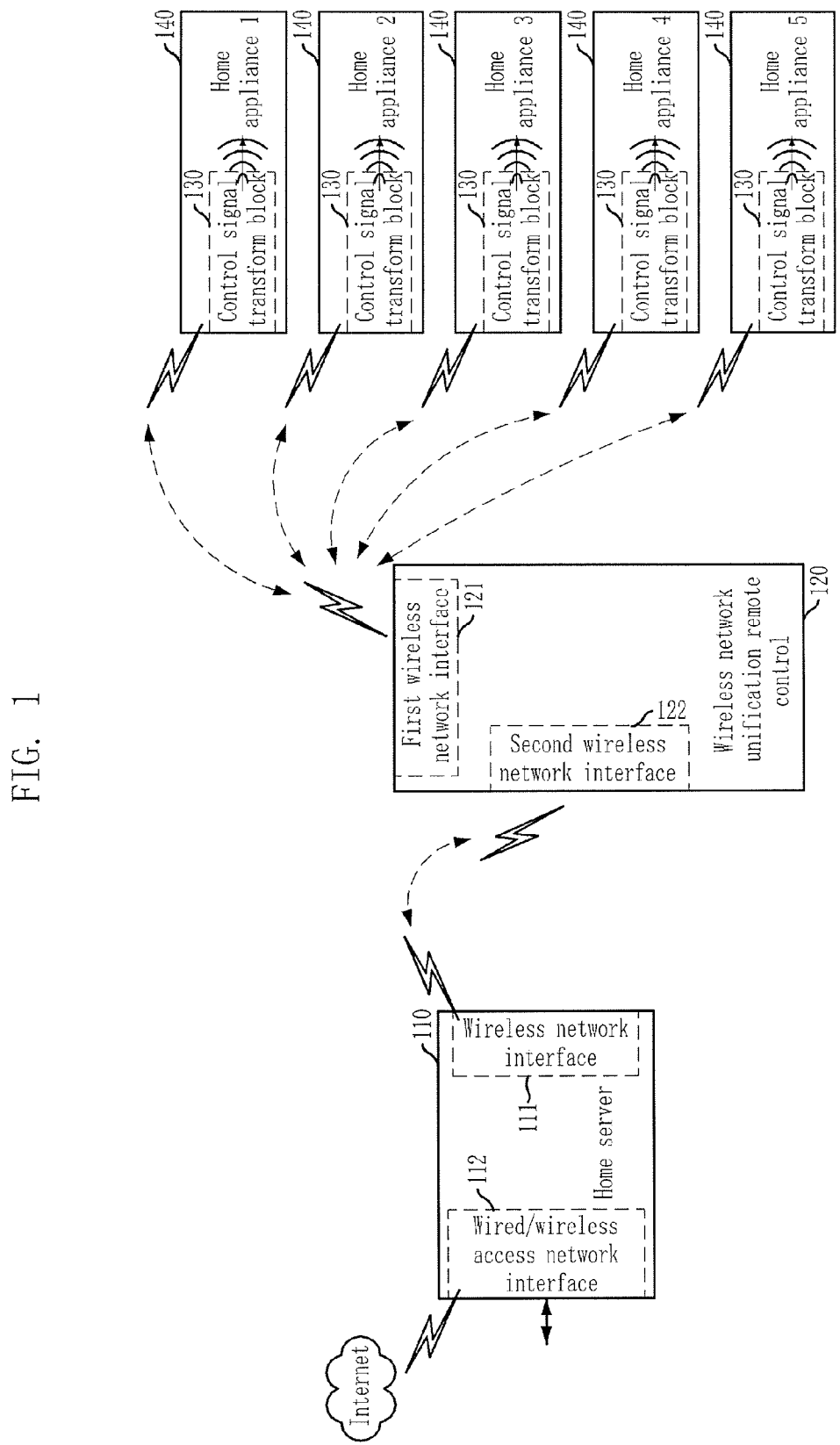
FIG. 1 is a block diagram showing a home network system where the present invention is applied.

FIG. 1 is a block diagram showing a home network system where the present invention is applied.

Referring to FIG. 1, the home network system includes a home server 110, a wireless network based integrated remote control 120, and a control signal transform block 130. The wireless network based integrated remote control 120 includes a first wireless network interface 121 and a second wireless network interface 122. The home server 110 includes a wireless network interface 111 and a wired/wireless access network interface 112.

The wireless network based integrated remote control 120 generally controls home appliances 140 of a plurality of kinds and quantities based on Wireless Personal Area Network (WPAN). That is, the wireless network based integrated remote control 120 receives device product information of the home appliances 140 recognized through user's configuration or own recognition, e.g., a company of the product and a kind of the product, from the control signal transform block 130. The wireless network based integrated remote control 120 displays a list of controllable home appliances to the user based on the transferred device product information and transfers a control profile corresponding to the device product information of the home appliances 140 to the control signal transform block 130. The wireless network based integrated remote control 120 transfers a wireless network message to the control signal transform block 130 through the WPAN in order to control the home appliances 140 upon control request of the home appliances 140 by the user. The wireless network based integrated remote control 120 dynamically reforms the WPAN according to moving of the user having the wireless network based integrated remote control 120 and can change the list of the home appliances 140, which is a control object of the wireless network based integrated remote control 120.

The control signal transform block 130 subscribes to the WPAN by responding to a WPAN's message format transferred from the wireless network based integrated remote control 120, and transfers the device product information recognized through user's configuration or own recognition from the home appliances 140 to the wireless network based integrated remote control 120 through the WPAN. The control signal transform block 130 requests and receives a control profile corresponding to the device product information. Subsequently, the control signal transform block 130 transforms the wireless network control message transferred from the wireless network based integrated remote control 120 into an infrared ray remote control signal based on the control profile, and transfers the wireless network control message to the home appliances 140. The control signal transform block 130 is attached around an infrared ray sensor of the home appliances 140.

The home server 110 transfers the control profile corresponding to the device product information upon request of the wireless network based integrated remote control 120 through the wireless network interface 111. Otherwise, when the control profile does not exist, the home server 110 downloads a control profile on a new home appliance based on the wired/wireless access network interface 112. The home server 110 transfers the control profile downloaded through the wireless network interface 111 to the wireless network based integrated remote control 120. A procedure of downloading the control profile will be described in detail with reference to FIG. 5.

Figure 2:
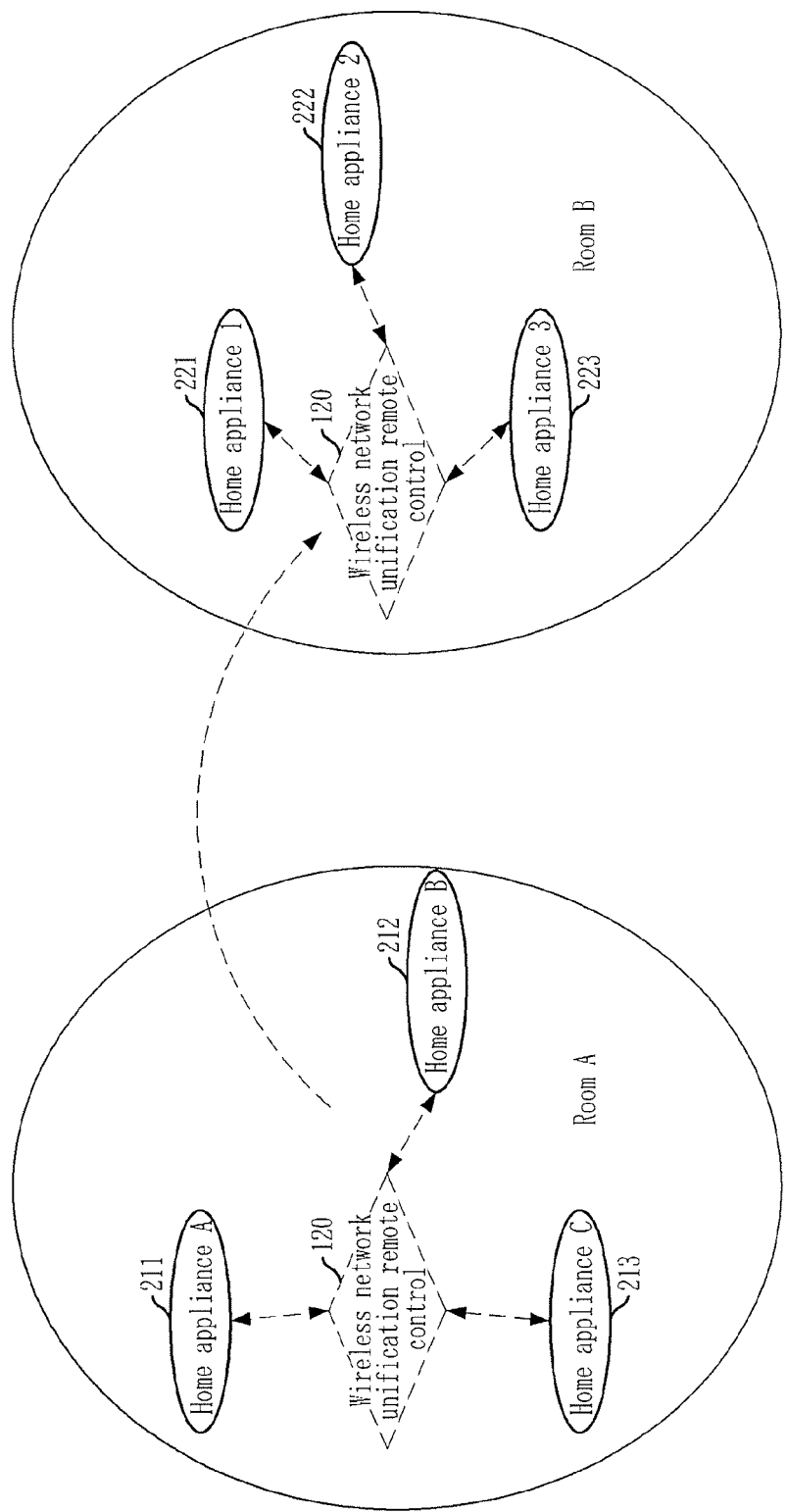
FIG. 2 shows a procedure of constructing a Wireless Personal Area Network (WPAN) according to moving of a wireless network based integrated remote control applied to the present invention.

FIG. 2 shows a procedure of constructing the WPAN according to moving of the wireless network based integrated remote control applied to the present invention.

Referring to FIG. 2, the wireless network based integrated remote control 120 builds the WPAN including a home appliance A 211, a home appliance B 212, and a home appliance C 213 when the user is in a room A. When the user moves to a room B, a wireless network is changed and the wireless network based integrated remote control 120 builds a new WPAN including a home appliance 1 221, a home appliance 2 222, and a home appliance 3 223.

When the new WPAN is built, the list of the home appliances which are controllable by the wireless network based integrated remote control 120 is changed from the home appliance A 211, the home appliance B 212, and the home appliance C 213 into the home appliance 1 221, the home appliance 2 222, and the home appliance 3 223. The wireless network based integrated remote control 120 can provide the list of the controllable home appliances to the user by displaying the change procedure of the home appliance list on a monitor in real-time.

Figure 3:
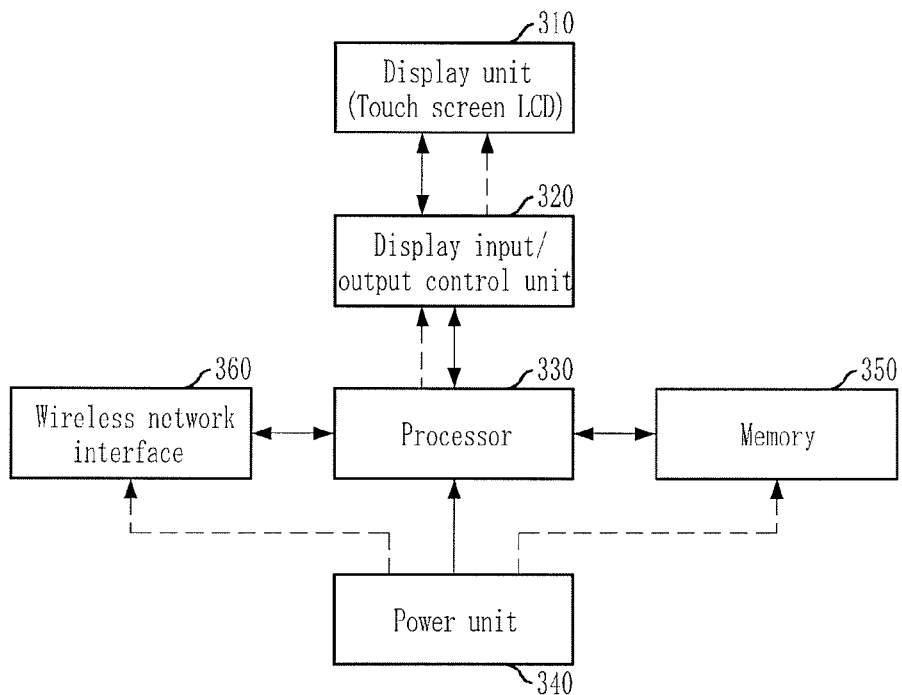
FIG. 3 is a block diagram illustrating the wireless network based integrated remote control in an apparatus controlling home appliances using zigbee wireless communication in accordance with an embodiment of the present invention.

FIG. 3 is a block diagram illustrating the wireless network based integrated remote control in the apparatus controlling home appliances using the zigbee wireless communication in accordance with an embodiment of the present invention.

Referring to FIG. 3, the wireless network based integrated remote control 120 includes a display unit 310, a display input/output control unit 320, a processor 330, a power unit 340, a memory 350, and a wireless network interface 360. The wireless network interface 360 includes the first wireless network interface 121 for transferring/receiving wireless data to/from the home appliances 140 using the zigbee wireless communication, and the second wireless network interface 122 for receiving a new control profile on a new home appliance from the home server 110 through broadband wireless communication.

The processor 330 controls the display input/output control unit 320, the memory 350, and the wireless network interface 360 in order to control the process of the wireless network based integrated remote control 120 described above. That is, the processor 330 forms the WPAN with the home appliances based on the first wireless network interface 121. The processor 330 displays the controllable home appliances list to the user based on the device product information transferred from the home appliances 140 through the WPAN. Subsequently, the processor 330 reads the control profile upon home appliances control request of the user in the memory 350 and controls that the control profile is transferred through the first wireless network interface 121. Also, the processor 330 controls that the wireless network control message corresponding to the home appliance control request of the user is transferred to the home appliances 140 through the first wireless network interface 121.

The power unit 340 supplies power to the display unit 310, the display input/output control unit 320, the processor 330, the memory 350, and the wireless network interface 360 such that the user can move with the wireless network based integrated remote control 120. The power supplied from the power unit 340 is displayed as a dotted line in FIG. 3.

The memory 350 stores the control profile and the operation program, and operates the operation program. The display unit 310 supports interface with the user. The display input/output control unit 320 controls input/output of the display unit 310 according to control of the display input/output control unit 320. The first wireless network interface 122 performs zigbee wireless communication to form a WPAN between the control signal transform block 130 and the wireless network based integrated remote control 120. The second wireless network interface 122 performs wireless network communication broadband wireless communication with the home server 110.

Figure 4:
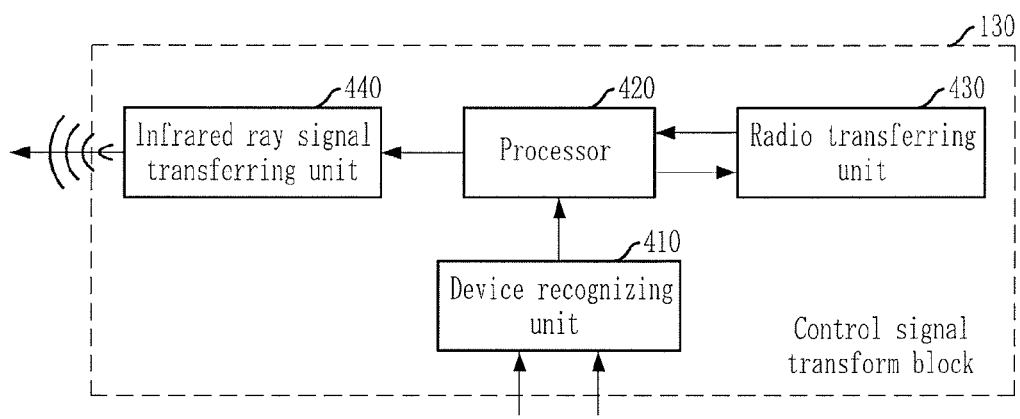
FIG. 4 is a block diagram showing a control signal transform block in the apparatus controlling home appliances using the zigbee wireless communication in accordance with an embodiment of the present invention.

FIG. 4 is a block diagram showing the control signal transform block in the apparatus controlling home appliances using the zigbee wireless communication in accordance with an embodiment of the present invention.

Referring to FIG. 4, the control signal transform block 130 includes a device recognizing unit 410, a processor 420, a radio transferring unit 430, and an infrared ray signal transferring unit 440.

The device recognizing unit 410 recognizes device product information of the home appliances 140 through home appliance configuration by the user or own recognition. For example, a product recognition procedure on the home appliance product can be performed through a bar-code system or a Radio Frequency Identification (RFID). The device product information enables configuration/recognition of the home appliances 140.

The radio transferring unit 430 transfers the wireless network control message transferred from the wireless network based integrated remote control 120 to the processor 420. The radio transferring unit 430 transfers the device product information transferred from the processor 420 to the wireless network based integrated remote control 120.

The processor 420 controls the infrared ray signal transferring unit 440 such that the wireless network control message transferred from the radio transferring unit 430 is transformed into the infrared ray remote control signal. The infrared ray signal transferring unit 440 transforms the wireless network control message transferred from the radio transferring unit 430 into an infrared ray remote control signal and transfers the infrared ray remote control signal to the home appliances 140.

Figure 5:
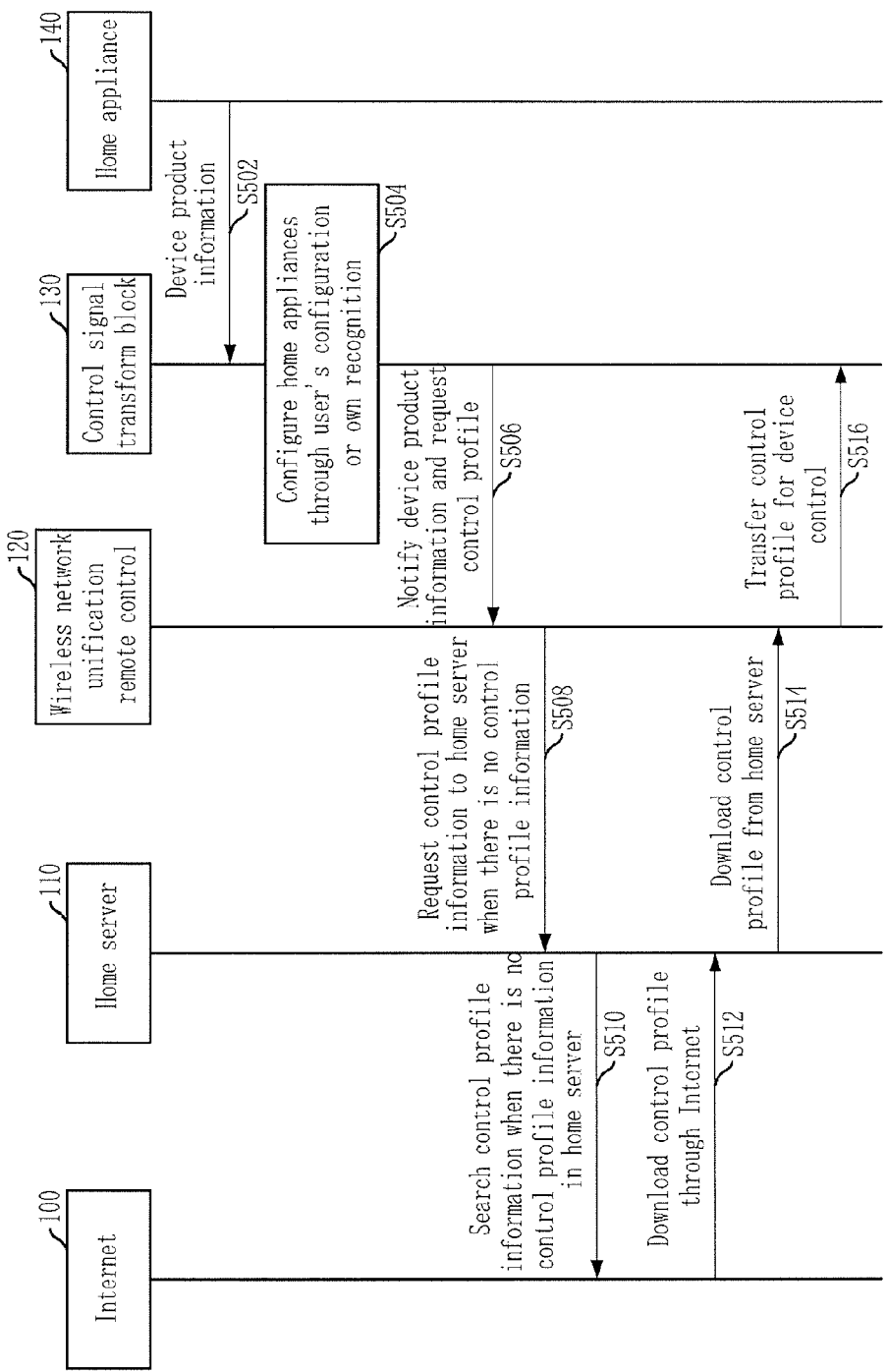
FIG. 5 is a flowchart describing a device configuration procedure in the control signal transform block of FIG. 1.

FIG. 5 is a flowchart describing a device configuration procedure in the control signal transform block of FIG. 1.

The control signal transform block 130 is installed around the infrared ray sensor of the home appliances 140 and acquires device product information from the home appliances 140 at step S502. The control signal transform block 130 configures the home appliances 140 through user's configuration or own recognition at step S504. When the control signal transform block 130 configures the home appliances 140 through own recognition by the wireless network, the device product information of the home appliances 140 can be transferred to the control signal transform block 130 by using the bar-code system or the RFID tag/reader. When the home appliances 140 are completely configured, the control signal transform block 130 notifies the device product information of the home appliances 140 to the wireless network based integrated remote control 120 and requests a control profile at step S506.

When the control profile is prepared in advance, the wireless network based integrated remote control 120 transfers the control profile for device control to the control signal transform block 130 at step S516. When the wireless network based integrated remote control 120 does not have the control profile information, the wireless network based integrated remote control 120 requests control profile information to the home server 110 at step S508.

When the control profile is prepared in advance, the home server 110 downloads a control profile to the wireless network based integrated remote control 120 at step S514. When the home server 110 does not have control profile information, the home server 110 searches and downloads the control profile through Internet at steps S510 and S512. The home server 110 performs the procedure of the step S514 and the wireless network based integrated remote control 120 performs the procedure of the step S516.

Figure 6:
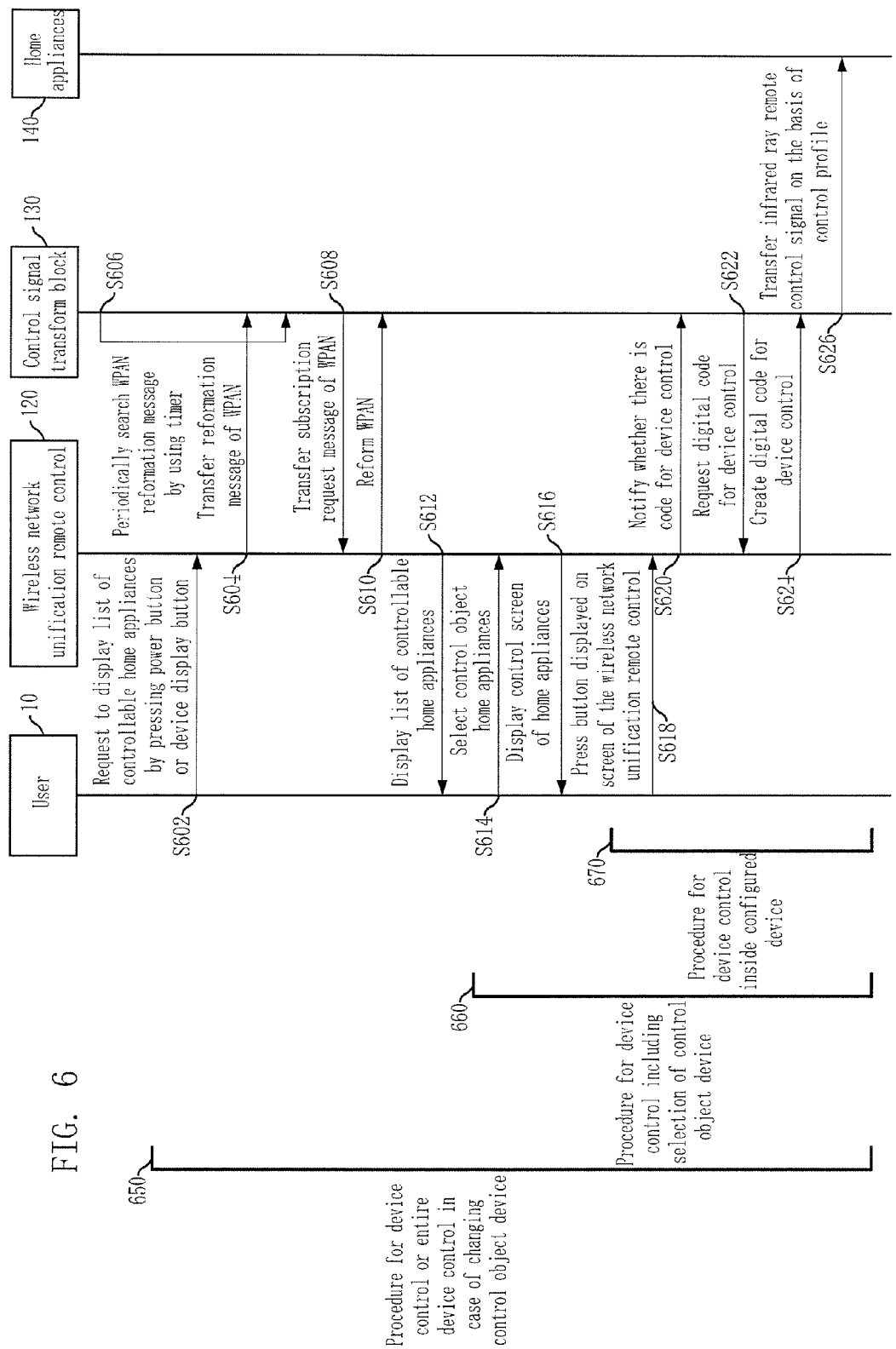
FIG. 6 is a flowchart describing a home appliances controlling method using the zigbee wireless communication in accordance with an embodiment of the present invention.

FIG. 6 is a flowchart describing the home appliances controlling method using the zigbee wireless communication in accordance with an embodiment of the present invention.

A user 10 requests the wireless network based integrated remote control 120 to display the list of the controllable home appliances 140 by pressing a power button or a device display button at step S602. The wireless network based integrated remote control 120 transfers a reformation message of the WPAN to the control signal transform block 130 to reform the WPAN centering the wireless network based integrated remote control 120 at step S604. The control signal transform block 130 is activated in a waiting state by using a timer and periodically searches a WPAN reformation message at step S606.

When the control signal transform block 130 senses the WPAN reformation message in the middle of searching the WPAN reformation message, the control signal transform block 130 transfers the subscription request message of the WPAN to the wireless network based integrated remote control 120 at step S608. The wireless network based integrated remote control 120 reforms the WPAN based on the subscription request message transferred from the control signal transform block 130 at step S610, and updates the list of the controllable home appliances 140 according to the reformed WPAN. The wireless network based integrated remote control 120 provides the list of the home appliances 140 as a control object by displaying the updated list of the controllable home appliances 140 at step S612. When the user 10 selects the home appliances 140 as a control object in the list of the control object home appliances 140 at step S614, the wireless network based integrated remote control 120 displays a control screen of the home appliances 140 at step S616.

The user 10 inputs a control command by pressing the button displayed on screen of the wireless network based integrated remote control 120 for control at step S618. The wireless network based integrated remote control 120 notifies to the control signal transform block 130 at step S620 whether there is a code for device control.

The control signal transform block 130 requests a digital code for device control at step S622. The wireless network based integrated remote control 120 creates a digital code for device control and transfers the digital code to the control signal transform block 130 at step S624. The control signal transform block 130 transforms the digital code for device control into an infrared ray remote control signal on the basis of control profile and transfers the infrared ray remote control signal to the home appliances 140 at step S626.

A reference number 650 denotes a procedure for device control or entire device control in case of changing control object device. A reference number 660 denotes a procedure for device control including selection of control object device. A reference number 660 denotes a procedure for device control inside configured device.

Figure 7:
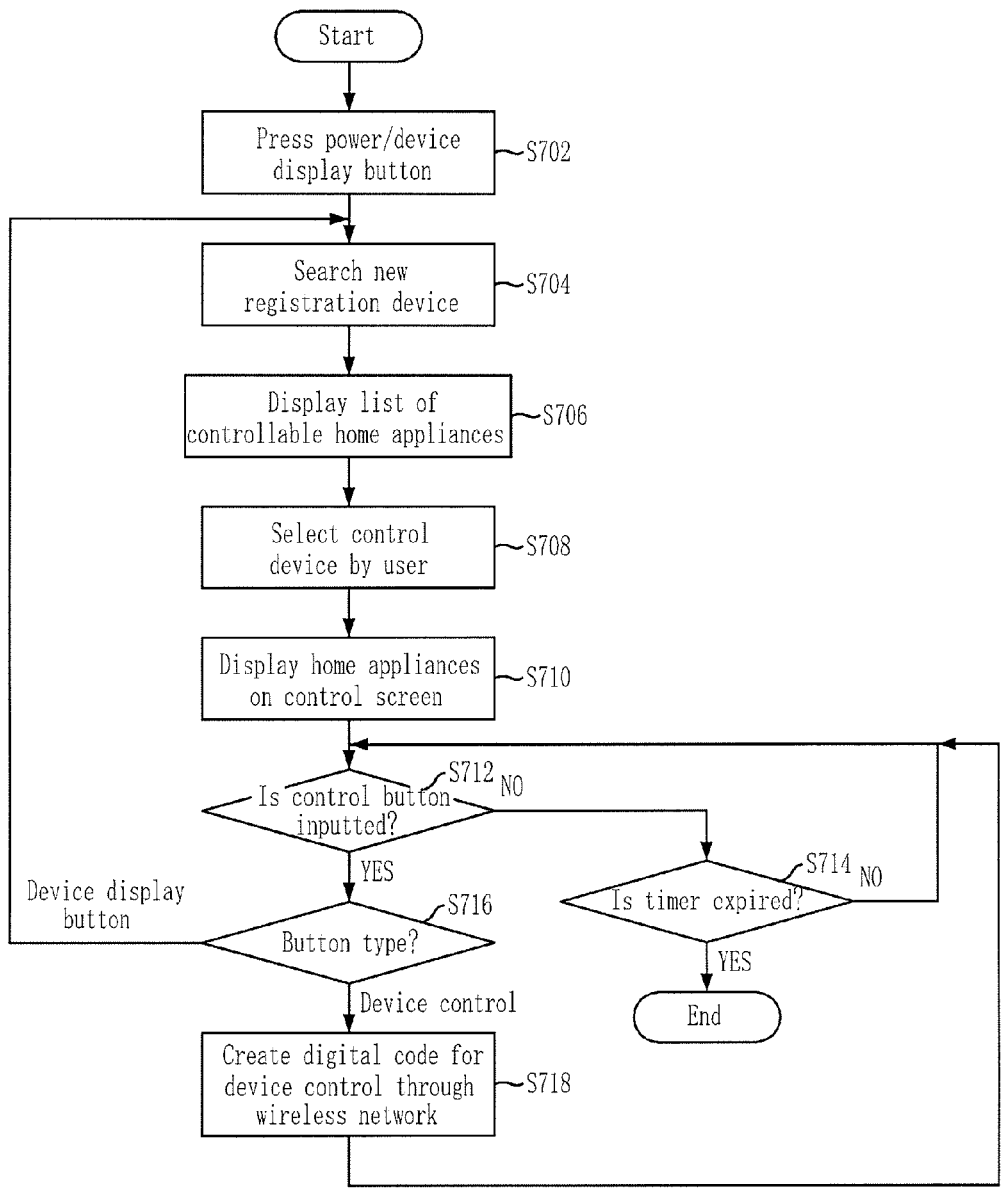
FIG. 7 is a flowchart describing the home appliances controlling method using the zigbee wireless communication in the wireless network based integrated remote control of FIG. 1.

FIG. 7 is a flowchart describing the home appliances controlling method using the zigbee wireless communication in the wireless network based integrated remote control of FIG. 1.

The user 10 presses the power button or the device display button, and operates the wireless network based integrated remote control 120 at step S702. The wireless network based integrated remote control 120 searches a new registration device at step S704. The wireless network based integrated remote control 120 displays the list of the controllable home appliances 140 to the user at step S706. The wireless network based integrated remote control 120 displays the home appliances 140 on control screen at step S710 upon selection request of the control device from the user 10 at step S708.

The wireless network based integrated remote control 120 checks whether the control button is inputted at step S712. When the control button is inputted, the wireless network based integrated remote control 120 identifies an inputted control button type at step S716. When the identified control button type is a device control type, the wireless network based integrated remote control 120 creates a digital code for device control at step S718. When the control button type is a device display button type, the logic flow goes to the procedure of the step S704. When the control button is not inputted, the wireless network based integrated remote control 120 checks expiration data of a timer at step S714. When the timer is expired, the logic flow goes to the end. When the timer is not expired, the logic flow goes to the procedure of the step S712.

Figure 8:
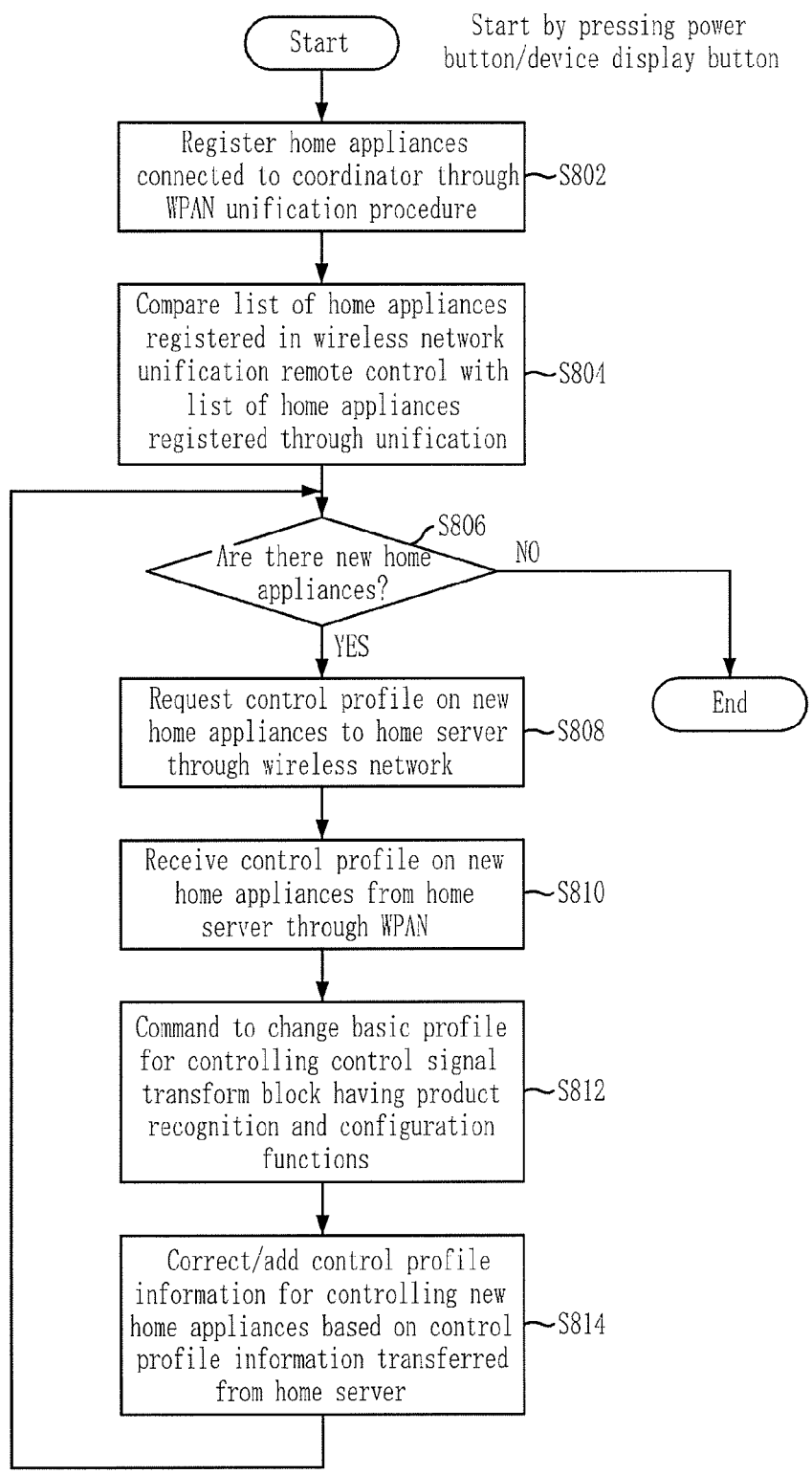
FIG. 8 is a flowchart describing a new registration device searching procedure of FIG. 7.

FIG. 8 is a flowchart describing the new registration device searching procedure of FIG. 7.

The wireless network based integrated remote control 120 registers the home appliances 140 connected to a coordinator through a WPAN unification procedure at step S802. The list of the controllable home appliances 140 registered in the wireless network based integrated remote control 120 is compared with the list of the home appliances registered through unification at step S804.

The wireless network based integrated remote control 120 checks at step S806 whether there are new home appliances. When there are new home appliances, the wireless network based integrated remote control 120 requests a control profile on the new home appliances to the home server 110 through a wireless network at step S808. When there is no new home appliance, the logic flow goes to the end.

The wireless network based integrated remote control 120 receives the control profile on the new home appliances from the home server through the WPAN at step S810. The wireless network based integrated remote control 120 transfers the control profile to the control signal transform block 130 having product recognition and configuration functions and commands to change a basic profile at step S812. The wireless network based integrated remote control 120 corrects/adds control profile information for controlling the new home appliances based on the control profile information on the new home appliances transferred from the home server 110 at step S814.

Figure 9:
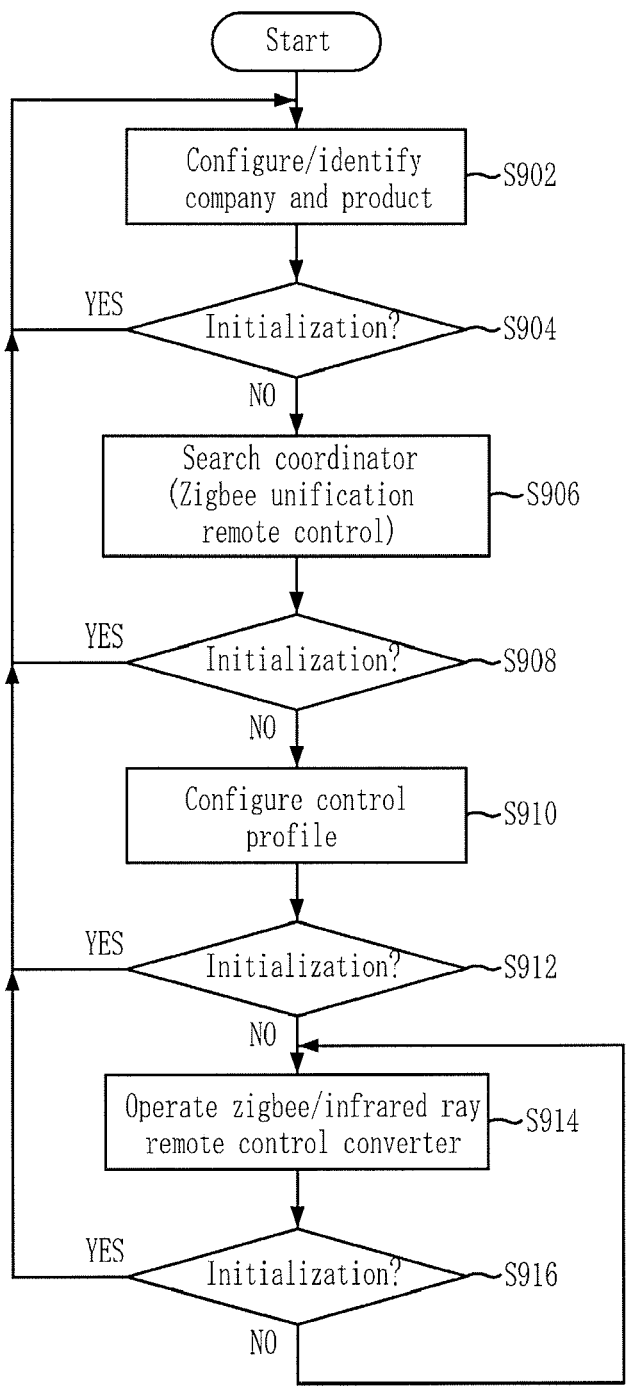
FIG. 9 is a flowchart describing the control signal transform procedure in the control signal transform block of FIG. 1.

FIG. 9 is a flowchart describing the control signal transform procedure in the control signal transform block of FIG. 1.

To have a look at a procedure of transforming a wireless network control message into an infrared ray remote control signal in the control signal transform block 130, the control signal transform block 130 configures or identifies a company and a product of the home appliances 140 at step S902. The control signal transform block 130 checks at step S904 whether there is initialization. When there is no initialization, the control signal transform block 130 searches a coordinator, i.e., the wireless network based integrated remote control 120, at step S906. When it turns out that there is initialization, the logic flow goes to the step S902. The control signal transform block 130 checks at step S908 whether there is initialization. When there is no initialization, the control signal transform block 130 configures a control profile with respect to the infrared ray remote control at step S910 and checks at step S912 whether there is initialization. When it turns out that there is initialization, the logic flow goes to the step S902.

The control signal transform block 130 operates a zigbee/infrared ray remote control converter and transforms a wireless network control message into an infrared ray remote control signal based on the control profile with respect to the infrared ray remote control at step S914. The control signal transform block 130 checks at step S916 whether there is initialization. When it turns out that there is no initialization, the logic flow goes to the step S914. When there is initialization, the logic flow goes to the step S902. The procedure of the step S914 will be described in detail according to a detailed operation procedure exemplified in FIG. 10.

Figure 10:
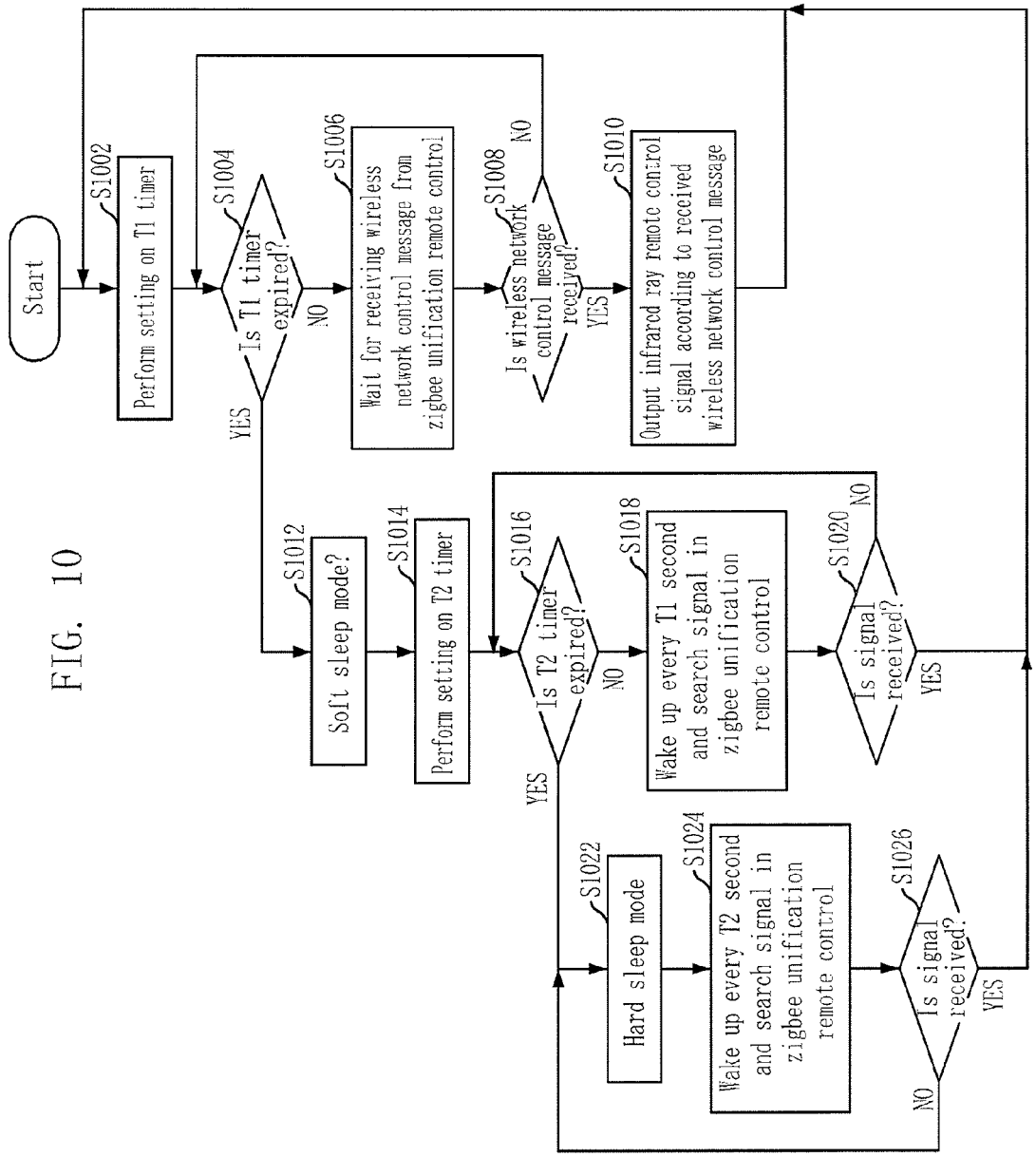
FIG. 10 is a flowchart illustrating the control signal transform procedure in the control signal transform block of FIG. 1

FIG. 10 is a flowchart illustrating the control signal transform procedure in the control signal transform block of FIG. 1.

Referring to FIG. 10, the control signal transform block 130 can realize a low power function of the zigbee wireless network through rest and check by using a multi-step timer.

The control signal transform block 130 performs setting on a T1 timer at step S1002. The control signal transform block 130 checks at step S1004 whether the T1 timer is expired. When the T1 timer is not expired, the control signal transform block 130 waits for receiving a wireless network control message from the wireless network based integrated remote control, i.e., the zigbee unification remote control 120, at step S1006. The control signal transform block 130 checks at step S1008 whether the wireless network control message is received, transforms the infrared ray remote control signal according to the received wireless network control message, and outputs the infrared ray remote control signal to the home appliances 140 at step S1010. When the control signal transform block 130 does not receive the wireless network control message, the logic flow repeatedly goes to the procedure of the step S1004. When it turns out that the T1 timer is expired, the control signal transform block 130 operates in a soft sleep mode at step S1012, and performs setting on a T2 timer at step S1014. The control signal transform block 130 checks at step S1016 whether the T2 timer is expired, wakes up every T1 second, and searches a signal in the wireless network based integrated remote control 120 at step S1018. The control signal transform block 130 checks at step S1020 whether the signal is received. When the signal is received, the logic flow repeatedly goes to the procedure of the step S1002. When the signal is not received, the logic flow repeatedly goes to the procedure of the step S1016. When the T2 timer is expired, the control signal transform block 130 operates in a hard sleep mode at step S1022, wakes up every T2 second, and searches a signal in the wireless network based integrated remote control 120 at step S1024. The control signal transform block 130 checks at step S1026 whether the signal is received. When the signal is received, the logic flow repeatedly goes to the step S1002. When the signal is not received, the logic flow repeatedly goes to the step S1022.

Figure 11:
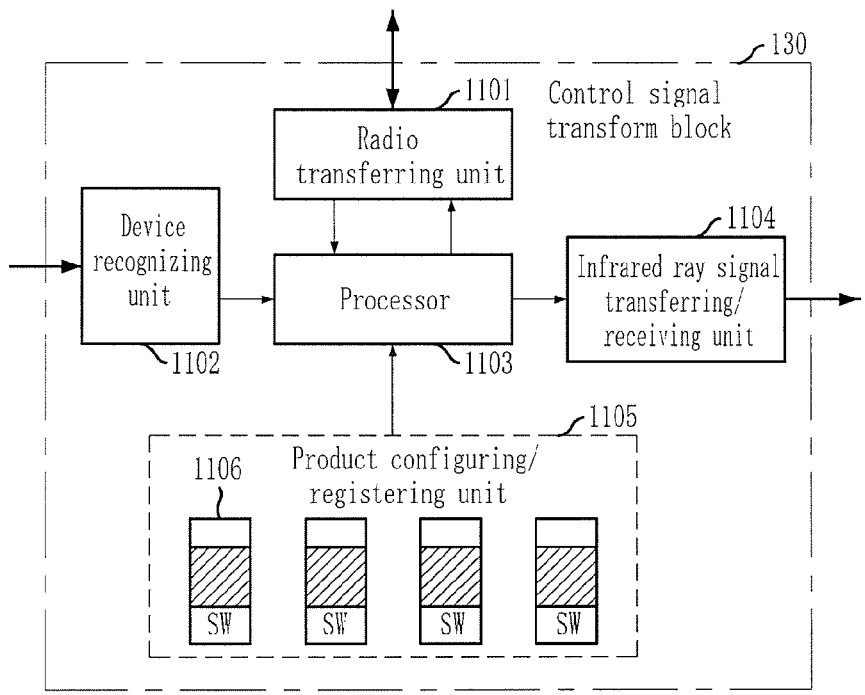
FIG. 11 is a block diagram showing the control signal transform block having a switch for configuration/recognition of the home appliances in accordance with an embodiment of the present invention.

FIG. 11 is a block diagram showing the control signal transform block having a switch for configuration/recognition of the home appliances in accordance with an embodiment of the present invention.

Referring to FIG. 11, the control signal transform block 130 includes a radio transferring unit 1101, a device recognizing unit 1102, a processor 1103, an infrared ray signal transferring/receiving unit 1104, and a product configuring/registering unit 1105. Functions of the radio transferring unit 1101, the device recognizing unit 1102, the processor 1103, and the infrared ray signal transferring/receiving unit 1104 are the same as described above. The additional product configuring/registering unit 1105 will be described as follows.

The product configuring/registering unit 1105 includes a plurality of dual inline package (DIP) switches 1106 for product configuration and registration by the user. The user can input product configuration and registration information based on combined information by turning on/off a plurality of DIP switches 1106.

Figure 12:
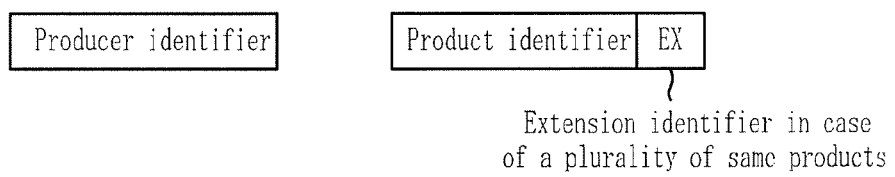
FIG. 12 shows device product information applied to the present invention.

FIG. 12 shows device product information applied to the present invention.

The device product information for transferring product information includes a producer identifier 1201 and a product identifier 1202. The producer identifier 1201 includes producer information of the home appliances 140 and the product identifier 1202 includes product information of the home appliances 140. When the home appliances 140 are a plurality of same products, the device product information for transferring product information includes the product identifier adding an extension identifier 1203. The extension identifier 1203 is product information on a plurality of same products and is used to identify the same products.

In the present invention, the user can easily control a plurality of home appliances by using the wireless network based integrated remote control by forming the WPAN, i.e., zigbee wireless communication, based on product information of each home appliance on the basis of wireless network, e.g., zigbee, transferring a control message transferred through the WPAN to each home appliance, transforming the control message into the infrared ray remote control signal, and transferring the control message to the home appliances.

In the present invention, since the control signal transform block for transforming the control message into the infrared ray remote control signal through the wireless network has product configuration and recognition functions of the control object device, the wireless network based integrated remote control can dynamically change the controllable home appliances according to the moving range of the user by notifying the device product information to the wireless network based integrated remote control.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. An apparatus for controlling a plurality of home appliances using zigbee wireless communication, comprising: a memory for storing a control profile and an operation program, and operating the stored operation program; a display means for supporting interface with a user; a display input/output control means for controlling input/output of the display means; a first wireless network interface for transmitting/receiving wireless data to/from home appliances based on zigbee wireless communication; and a control means for forming at least two or more Wireless Personal Area Networks (WPANs) with the at least one of the respective home appliances based on the first wireless network interface, displaying a list of controllable home appliances for the respective WPAN formed based on device product information transferred from the home appliances through the WPAN, reading a control profile in the memory upon home appliances control request of the user, a control signal transform means for transferring the product information of the home appliances to the control means through the formed WPAN, receiving the control profile on the product information of the home appliances, transforming a wireless network control message transferred from the first wireless network into an infrared ray remote control signal based on the control profile, and controlling the home appliances, wherein each of the formed WPAN is based on the user being at a unique location, wherein the list of the controllable home devices for each of the respective formed WPANs have the respective home appliances which are exclusive of any of the other respective home appliance on the list of the controllable home devices in any of the other formed WPANs.

2. The apparatus of claim 1, further comprising:
a second wireless network interface for receiving a new control profile on new home appliances from a server through broadband wireless communication.

3. The apparatus of claim 1, wherein the control signal transform means includes: a device recognizing unit for recognizing the product information of the home appliances; a third wireless network interface for performing zigbee wireless communication with the first wireless network interface; a processor for controlling procedures of transferring the recognized device product information to the first wireless network interface through the third wireless network interface, receiving a profile through the third wireless network interface, and transforming the transferred wireless network control message into an infrared ray remote control signal based on the control profile; and an infrared ray signal transferring unit for transforming the wireless network control message into an infrared ray remote control signal by control of the processor, and transferring the infrared ray remote control signal to the home appliance.

4. The apparatus of claim 3, wherein the device recognizing unit recognizes the product information of the home appliances according to combination of dual inline package (DIP) switches by the user.

5. A method for controlling a plurality of home appliances based on a wireless network based integrated remote control having a zigbee wireless communication function, comprising the steps of:

forming at least two or more Wireless Personal Area Networks (WPANs) by transferring a WPAN's message format to home appliances based on zigbee wireless communication;

receiving device product information through the formed WPAN and transferring a control profile corresponding to the transferred device product information to each home appliance;

displaying a list of controllable home appliances for the respective WPAN formed to a user, creating a wireless network control message upon receiving a device control request of the user, and transferring the wireless network control message to the home appliances; and transforming the transferred wireless network control message into an infrared ray remote control signal on the basis of transferred control profile in the home appliances, wherein each of the formed WPAN is based on the user being at a unique location, wherein the list of the controllable home devices for each of the respective formed WPANs have the respective home appliances which are exclusive of any of the other respective home appliance on the list of the controllable home devices in any of the other formed WPANs.

6. The method of claim 5, further comprising the step of:

receiving a control profile on home appliances, which is a new control object, from a server through broadband wireless communication when a control profile corresponding to the transferred device product information does not exist.

* * * * *